Patented Aug. 8, 1950

2,518,351

UNITED STATES PATENT OFFICE 2,518,351

N(THIOPHENALKYL) ARYLAMINES IN MINERAL OIL

John H. McCracken, Corpus Christi, Tex., assignor to Socony-Vacuum Oil Company, Incorporated, a corporation of New York No Drawing. Application May 28, 1947,
Serial No. 751,124

6 Claims. (Cl. 252—47)

This invention relates to a new group of chemical compounds, which compounds are useful in improving mineral oil, and to certain mineral oil compositions containing them.

Prior to this invention, arylamines such as aniline, naphthylamines, anthranylamines, ethyl aniline, amyl aniline, and aminoethyl benzenes, as well as a number of quasi-arylamines, such as benzylamine, where the amino group is one or two carbon atoms removed from the nucleus were well known. Many of these were known to be useful addition agents for mineral oil, mainly for the purpose of stabilizing the oil against oxidation and deterioration.

Also known were alkyl substituted thiophenes and haloalkyl substituted thiophenes such as 2 - methylthiophene, 2 - chlormethylthiophene. The corresponding ethyl, propyl and butyl compounds can be prepared. These are not known to have been previously used as mineral oil addition agents.

According to the present invention it has been discovered that aryl or quasi-arylamines can be reacted with haloalkylthiophenes to produce new compounds that may be generally designated as N(thiophenalkyl) arylamines or N(thiophenalkyl) quasi-arylamines. These compounds, especially the N(thiophenmethyl) naphthylamines, when added in small amounts to mineral oil, have been found to markedly improve its properties, particularly its stability against oxidation and discoloration. Ordinarily, the desired improvement can be accomplished by the addition of 1% or less of the new improving agents, but in some instances as much as 10% is desirable.

As examples of the new class of compounds to which this invention relates, the following compounds have been prepared.

Example I

Chloromethylthiophene was prepared by the procedure outlined by Blicke and Burckhalter, Journal of the American Chemical Society, vol. 64, page 477 (1942), except that the procedure was simplified by using liquid hydrochloric acid instead of gaseous hydrochloric acid.

A 3-necked flask of suitable size, fitted with a mechanical stirrer and two dropping funnels was used for the reaction. In it was placed 85 cc. (1 mol) of concentrated hydrochloric acid. The reaction flask was cooled in an ice bath and 40 g. (0.5 mol) of 37% formaldehyde solution and 42 g. (0.5 mol) of thiophene were added dropwise from the funnels over a period of two hours. The mixture was stirred for an additional hour.

The lower layer was drawn off and the upper layer diluted with an equal volume of water and extracted with ether. The extract was combined with the lower layer and the resultant product washed three times with distilled water, dried over calcium chloride, the ether distilled off, and the residue distilled under reduced pressure.

There resulted 10 g. (0.12 mol) of chloromethylthiophene boiling at 74–80° C. at 16 mm. pressure, and 5 g. of dithienylmethane boiling at 115–128° C. at 4 mm. pressure. The freshly distilled chloromethylthiophene is a water-white liquid with an odor like that of benzylchloride.

By fractionating the ether distillate and the forerun of the vacuum distillation, 11 g. (0.13 mol) of thiophene were recovered. Thus, the conversion of thiophene to chloromethylthiophene was 33%.

Solutions of 36 g. (0.26 mol) of alpha-naphthylamine in 100 cc. of anhydrous ethyl ether and 10 g. (0.12 mol) of chloromethylthiophene in 25 cc. of anhydrous ethyl ether were mixed and allowed to stand at room temperature for 24 hours. The precipitated naphthylamine hydrochloride was filtered off and the ether solution washed with water. After drying and distilling off the ether, the product was a very dark purple oil. This will later be designated product A.

Product A was purified by distillation at 4 mm. pressure. A small fraction of alpha-naphthylamine boiling at 140–180° C. was discarded and the final product collected at 230–260° C. The product was a viscous oil, light orange in color when freshly distilled but darkening on exposure to air. Its boiling point and other characteristics clearly indicate it to be a new chemical compound and it follows logically from theoretical consideration and the characteristics of the product that it was N-(2-thiophenmethyl)-alpha-naphthylamine. This purified product will later be designated product B.

Example II

Chloromethylthiophene prepared as in Example I was reacted with beta-naphthylamine in the same manner as it was reacted with alpha-naphthylamine in Example I. The results were substantially the same except that the product boiled at 195–210° C. at 1.5 mm. pressure. This product is apparently N-(2-thiophenmethyl)-beta-naphthylamine.

*Example III*

In a similar manner, chloromethylthiophene was reacted with aniline to produce N-(2-thiophenmethyl)-aniline. The product boiled at 135–150° C. at 2–3 mm. pressure.

*Example IV*

In a similar manner chloromethylthiophene was reacted with benzylamine to produce N-(2-thiophenmethyl)-benzylamine, the product boiling at 155–160° C. at 5 mm. pressure.

*Example V*

One of the corresponding di-substituted compounds was prepared by reacting one mol of N-(2-thiophenmethyl)-alpha-naphthylamine prepared according to Example I with one mol of chloromethylthiophene in ether solution. The resultant compound was apparently N.N-bis(2-thiophenmethyl)-alpha-naphthylamine. This compound was a glassy, waxy mass which was left after distilling out unreacted materials up to 225° C. at 5 mm. pressure. It had a sulphur content of 17.8% as against a calculated sulphur content for the pure compound of 19.2%, but this was doubtless due to the presence of a certain percentage of the mono-substituted compound, as an impurity. The compound was difficult to purify due to its high molecular weight.

The new compounds have, among other things, been tested for effectiveness as addition agents to mineral oils in percentages ranging from 0.05% to 0.2% and the mineral oil compositions show definite improvement as to color and neutralization number under test. This improvement is especially marked when compounds of this series are used which contain a naphthalene nucleus to which is directly attached a nitrogen atom substituted by one or more alkylthiophene radicals.

The following are examples of mineral oils stabilized by the addition of various of the new compounds. The oils used in the following examples were:

| Oil | Viscosity S. U. V. at 100° F. | Flash Point, ° F. | Specific Gravity |
| --- | --- | --- | --- |
| A | 69 | 310 | 0.871 |
| B | 150 | 420 | 0.856 |
| C | 150 | 385 | 0.879 |
| D | 318 | 435 | 0.872 |

*Example VI*

Oil A is a highly refined oil suitable for use in transformers. This oil was prepared by treating a Coastal distillate with 40 pounds of 98% sulphuric acid and 180 pounds of 103% oleum, per barrel. This was followed by washing and percolating through clay. This type of oil tends to form acidic products on oxidation. The oil was tested by heating samples to 120° C. and bubbling oxygen through them for 70 hours. The oxidation was then determined by titrating with an alcoholic solution of potassium hydroxide. The data obtained for the oil alone and for the oil blends containing typical reaction products contemplated herein are set forth in the following table in terms of Neutralization Numbers. These represent milligrams of potassium hydroxide required to neutralize the acids formed in a gram of oil.

| Composition | Neutralization Number |
| --- | --- |
| Oil A | 18.5 |
| Oil A+0.2% of product A of Example I | 0.02 |
| Oil A+0.1% of product B of Example I | 0.04 |
| Oil A+0.1% of product of Example V | 0.02 |

*Example VII*

Motor oils, and especially those refined by certain solvent-extraction methods tend to oxidize when submitted to high temperatures. Under these conditions, they tend to form products which are corrosive to metal bearings. This corrosive action may be quite severe with certain types of bearings, such as those having the corrosion susceptibility of cadmium-silver alloys, and may cause their failure within a relatively short period of time.

The following test was used to determine the corrosive action of a motor oil on an automobile connecting rod bearing. Oil D consisted of Pennsylvania neutral and residuum stocks separately refined by means of chlorex and then blended to give an A. S. E. 20 motor oil. The oil was tested by adding a section of a bearing containing a cadmium-silver alloy surface and weighing about 6 g. and heating it to 175° C. for 22 hours while a stream of air was bubbled against the surface of the bearing. The loss in weight of the bearing during this treatment measures the amount of corrosion which has taken place. The following results were obtained:

| Composition | Loss in Weight of Bearing, ml. |
| --- | --- |
| Oil D | 29 |
| Oil D + 0.2% of product A of Example I | nil |
| Oil D | 24 |
| Oil D + 0.1% of product A of Example I | 0 |
| Oil D + 0.05% of product A of Example I | 0 |
| Oil D | 34 |
| Oil D + 0.05% of product B of Example I | 0 |

*Example VIII*

Oil B was a distillate from a Rodessa crude which was refined with furfural, dewaxed and filtered. This oil was of the type suitable for use in turbines. The oil was tested by bubbling 0.3 liters of oxygen per hour through 25 milliliter samples of the oil in the presence of copper and iron spirals. 5 milliliters of water were added to each sample which were kept at a temperature of 99° C. A reflux condenser was provided for each sample in order to avoid loss of water. The following results were obtained:

| Composition | Hours | Color (Lovibond) | Neutralization No. |
| --- | --- | --- | --- |
| Oil B | 72 | 223 | 20.6 |
| Oil B+0.2% Product A of Example I | 168 | 0.5 | 0.02 |
| Do | 336 | 2.0 | 0.02 |
| Do | 2,376 | 25 | 4.1 |
| Oil B+0.1% Product B of Example I | 336 | 0.8 | 0.02 |
| Do | 960 | 1.5 | 0.02 |

Example IX

Oil C was a mixed Mid-Continent and Coastal distillate that had been refined by treatment with 70 pounds of 98% sulphuric acid per barrel. After the acid treatment the oil was neutralized, washed and percolated through clay. Oil C and Oil B were tested by the Brown-Boveri turbine oil test method which involves heating a test sample of the oil in the presence of a piece of copper foil at a temperature of 110° C. in air, for 72 hours, after which the color and Neutralization Number are determined. These are indicative of the extent to which the oil is affected by oxidation. The following results were obtained:

| Composition | Color (Lovibond) | Neutralization No. |
|---|---|---|
| Oil B | 40 | 0.15 |
| Oil B+0.2% of Product A of Example I | 2 | 0.02 |
| Oil B+0.1% of Product B of Example I | 1.3 | 0.02 |
| Oil B+0.05% of Product B of Example I | 3 | 0.01 |
| Oil B+0.05% of the product of Example II | 1.1 | 0.03 |
| Oil C | 15 | 0.07 |
| Oil C+0.1% of Product B of Example I | 6 | 0.02 |
| Oil C+0.1% of Product of Example II | 5 | 0.01 |

Example X

Oil B and Oil C were also tested by the following method which is used to evaluate oils for use in turbines.

This method consists of placing 25 milliliters of the oil in each of several 150 x 25 millimeter test tubes. Each of the tubes is then covered with a glass lid and provided with a 5 millimeter delivery tube extending to the bottom of the tube. About one gram of iron nails and a copper foil are then added to each tube. During the test, the temperature is maintained at 91° C. and clean, dry air is bubbled through the oil at a rate of 5 liters per hour. Every 24 hours 2 milliliters of distilled water are added to each tube. Samples are recovered from each test tube at varying periods of time and are examined for acidity (neutralization number) and color. The following results were obtained:

| Composition | Hours | Color (Lovibond) | Neutralization Number |
|---|---|---|---|
| Oil B | 166 | 50 | 8.3 |
| Oil B+0.2% of Product A of Example I | 164 | 0.8 | 0.02 |
| Do | 474 | 8 | 0.02 |
| Oil B+0.1% of Product B of Example I | 960 | 1.6 | 0.02 |
| Oil B+0.5% of Product B of Example I | 330 | 1 | 0.02 |
| Do | 720 | 2.3 | 0.04 |
| Do | 1122 | 6 | 0.02 |
| Oil B+0.05% of the product of Example II | 160 | 20 | 4.7 |
| Do | 210 | 17 | 7.0 |
| Oil C | 240 | 110 | 2.5 |
| Do | 336 | 400 | 16.0 |
| Oil C+0.2% of Product A of Example I | 332 | 75 | 2.4 |
| Do | 408 | 80 | 3.7 |
| Oil C+0.1% of Product B of Example I | 331 | 20 | 0.1 |
| Do | 956 | 115 | 4.5 |
| Oil C | 162 | 19 | 1.0 |
| Do | 312 | 62 | 3.9 |
| Oil C+0.1% of Product B of Example I | 168 | 3 | 0.2 |
| Do | 331 | 20 | 0.1 |

It is within the scope of this invention to add to any lubricating composition, a sufficient proportion of any one, or any mixture of, the reaction products of this invention, to improve the characteristics thereof in any desired respect in which the reaction products are capable of improving them.

The basic lubricant in such a composition is preferably a petroleum lubricating oil of the general type commonly used in internal combustion engines and turbines. It is within the scope of this invention, however, to improve, in a similar manner, lubricants ranging all the way from gasoline and kerosene to heavy gear lubricants, petrolatum jelly and petroleum wax. Such lubricants may be derived from petroleum, or any other animal, mineral or vegetable source, or may be made synthetically.

It is also within the scope of this invention to prepare and market the reaction products of this invention per se, or in the form of oil concentrates containing percentages as high as 50% of the reaction products of this invention.

It is still further within the scope of this invention to incorporate either in the lubricating compositions or in the oil concentrates, other improving agents which function to improve the oils, or concentrates, in the same or other respects than those effected by the reaction products of this invention.

What is claimed is:

1. A mineral oil containing from about 1% to about 10% of a product resulting from the reaction involving from about 0.5 to about 1 molecular portion of a haloalkylthiophene in which the alkyl radical contains from about 1 to about 4 carbon atoms per radical and a single molecular portion of a compound selected from the group consisting of primary and secondary aryl amines and amines in which the amino radical is from 1 to 2 carbon atoms removed from an aryl radical, the temperature of the reaction being maintained at about room temperature.

2. A mineral oil containing from about 1% to about 10% of N-(2-thiophenmethyl)-alpha-naphthylamine.

3. A mineral oil containing from about 1% to about 10% of N.N-bis(2-thiophenmethyl)-alpha-naphthylamine.

4. A mineral oil containing from about 1% to about 10% of N-(2-thiophenmethyl)-beta-naphthylamine.

5. A mineral oil containing from about 1% to about 10% of N-(2-thiophenmethyl)-aniline.

6. A mineral oil containing from about 1% to about 10% of N-(2-thiophenmethyl)-benzylamine.

JOHN H. McCRACKEN.

REFERENCES CITED

The following references are of record in the file of this patent:

UNITED STATES PATENTS

| Number | Name | Date |
|---|---|---|
| 2,140,545 | Pier | Dec. 20, 1938 |
| 2,154,096 | Loane | Apr. 11, 1939 |
| 2,160,293 | Shoemaker | May 30, 1939 |
| 2,367,702 | Van Zoeren | Jan. 23, 1945 |